(12) United States Patent
Nogami et al.

(10) Patent No.: US 8,090,099 B2
(45) Date of Patent: Jan. 3, 2012

(54) COMPUTER-READABLE RECORDING MEDIUM RECORDING PROGRAM AND APPARATUS FOR ENCRYPTION/DECRYPTION, APPARATUS FOR MULTIPLICATION IN EXTENSION FIELD

(75) Inventors: Yasuyuki Nogami, Okayama (JP); Yoshitaka Morikawa, Okayama (JP)

(73) Assignee: National University Corporation Okayama University, Okayama (JP)

( * ) Notice: Subject to any disclaimer, the term of this patent is extended or adjusted under 35 U.S.C. 154(b) by 389 days.

(21) Appl. No.: 12/309,524

(22) PCT Filed: Jul. 24, 2007

(86) PCT No.: PCT/JP2007/064474
§ 371 (c)(1),
(2), (4) Date: Jan. 22, 2009

(87) PCT Pub. No.: WO2008/013154
PCT Pub. Date: Jan. 31, 2008

(65) Prior Publication Data
US 2009/0323929 A1    Dec. 31, 2009

(30) Foreign Application Priority Data

Jul. 24, 2006   (JP)  ................................ 2006-200946
Jan. 19, 2007   (JP)  ................................ 2007-010072

(51) Int. Cl.
*H04K 1/00* (2006.01)
*H04L 9/00* (2006.01)
*H04L 9/28* (2006.01)
*H04L 9/30* (2006.01)

(52) U.S. Cl. .......................................... 380/28; 380/30
(58) Field of Classification Search .............. 380/28–30; 726/1–36; 717/168–173; 711/163–164; 713/189
See application file for complete search history.

(56) References Cited

U.S. PATENT DOCUMENTS
2003/0206628 A1 * 11/2003 Gura et al. ...................... 380/28
(Continued)

FOREIGN PATENT DOCUMENTS
JP    2001-051832    *   2/2001
(Continued)

OTHER PUBLICATIONS

Augusto Jun Devegili et al, Multiplication and Squaring on Pairing-Friendly Fields, Dec. 2006.*

(Continued)

*Primary Examiner* — Jung Kim
*Assistant Examiner* — Shan Elahi
(74) *Attorney, Agent, or Firm* — Oliff & Berridge, PLC (57) ABSTRACT

There is provided a computer-readable recording medium recording a program for encryption/decryption, an apparatus for encryption/decryption, an apparatus for multiplication in an extension field, that enable to perform high speed multiplication processing, while allowing the selection of arbitrary key lengths. In multiplying two elements $A=\{a_0, a_1, a_2, \ldots, a_{m-1}\}$ and $B=\{b_0, b_1, b_2, \ldots, b_{m-1}\}$ in an extension field $F_{p^m}$ of extension degree m with a prime number p as characteristic, firstly, a positive integer k is determined such that km+1 is a prime number and p is a primitive element in $F_{km+1}$. Next, two elements A and B are multiplied as two elements in extension field $F_{p^{km}}$ of extension degree km with a prime number p as characteristic using the positive integer k. Lastly, using the result of such multiplication, a result of multiplication in an element in the extension field $F_{p^m}$ of extension degree m which is a subfield of $F_{p^{km}}$ is obtained.

9 Claims, 5 Drawing Sheets

U.S. PATENT DOCUMENTS

| | | | |
|---|---|---|---|
| 2003/0206629 A1* | 11/2003 | Eberle et al. | 380/30 |
| 2003/0208518 A1* | 11/2003 | Gura et al. | 708/492 |
| 2005/0265546 A1* | 12/2005 | Suzuki | 380/44 |

FOREIGN PATENT DOCUMENTS

| | | |
|---|---|---|
| JP | A-2001-051832 | 2/2001 |
| JP | A-2002-304120 | 10/2002 |
| JP | A-2003-084666 | 3/2003 |
| JP | A-2004-233428 | 8/2004 |
| JP | A-2005-284111 | 10/2005 |

OTHER PUBLICATIONS

Paar et al, Fast Arithmetic for Public-Key Algorithms in Galois Fields with Composite EXponents, Oct. 1999.*

Nogami-1I, Finite Extension Field with Modulus of All-One Polynomial and Representation of Its Elements for Fast Arithmatic Operation, Mar. 2003.*

Nogami-2, Cyclic Vector Multiplication Algorithm Based on a Special Class of Gauss Period Normal Basis, Dec. 2007.*

Nogami-3, An Improvement of Cyclic Vector Mulitplication Algorithm, 2008.*

Hidehiro Kato et al., "Cyclic Vector Multiplication Algorithm Based on a Special Class of Gauss Period Normal Basis," ETRI Journal, Dec. 2007, pp. 769-778, vol. 29, No. 6, Okayama, Japan.

Yasuyuki Nogami et al, "Finite Extension Field with Modulus of All-One Polynomial and Representation of Its Elements for Fast Arithmetic Operations," IEICE Trans. Fundamentals, Mar. 2003, pp. 1-12, vol. E86-A, No. 3, Okayama, Japan.

* cited by examiner

COMPUTER-READABLE RECORDING MEDIUM RECORDING PROGRAM AND APPARATUS FOR ENCRYPTION/DECRYPTION, APPARATUS FOR MULTIPLICATION IN EXTENSION FIELD

FIELD OF THE INVENTION

The present invention relates to a computer-readable recording medium recording a program for encryption/decryption, an apparatus for encryption/decryption, and an apparatus for multiplication in an extension field to perform multiplication processing in encryption or decryption.

DESCRIPTION OF THE RELATED ART

Conventionally, in information communication systems using telecommunication lines such as the Internet, encryption of data is implemented for keeping secrecy of transmitted and received data. That is, a transmitter who transmits plaintext data generates ciphertext data by performing encryption processing on the plaintext data and transmits the ciphertext data to a receiver. On the other hand, the receiver who receives the ciphertext data generates the plaintext data by performing decryption processing on the ciphertext data and can receive the plaintext data.

As a method for such encryption/decryption, in recent years, a method called public key cryptography has been employed. In public key cryptography, a public key and a secret key are set in advance and disclosed to transmitters who transmit predetermined plaintext data. A transmitter generates ciphertext data by encrypting plaintext data using the public key and transmits the ciphertext data to a receiver. The receiver, on reception of the ciphertext data, generates the plaintext data by decrypting the ciphertext data using his/her secret key.

Here, in the case of encrypting plaintext data, the plaintext data is split into pieces of predetermined data length in accordance with a key length of the public key used for encryption. A plurality of plaintext data of unit length are generated and ciphertext data of unit length is generated by performing multiplication processing using each plaintext data of unit length and the public key and then, ciphertext data composed of predetermined number of ciphertext data of unit length is generated.

On the other hand, in the case of decrypting ciphertext data, the ciphertext data is split into pieces of predetermined data length in accordance with a key length of the secret key used for decryption. A plurality of ciphertext data of unit length are generated and plaintext data of unit length is generated by performing multiplication processing using each ciphertext data of unit length and the secret key and then, plaintext data composed of predetermined number of plaintext data of unit length is generated.

In public key cryptography such as this, various methods have been proposed. There have been known Rivest Shamir Adleman (RSA) cryptography, elliptic curve cryptography, and ElGamal encryption and the like.

In recent years, there has been a growing threat that ciphertext data encrypted by various kinds of encryption methods could be decoded, along with the increase in performance of electronic computers such as personal computers. That is, since ciphertext data can be decoded if only a secret key is available, there has been a threat that ciphertext data could be decoded after a considerable time in a decryption attempt using secret keys generated at random by electronic computers.

Consequently, each encryption method has adopted longer key lengths of the public keys and the secret keys in order to increase security. That is, as the key lengths of the public keys and the secret keys are made longer, the number of the secret keys needed for decoding becomes exponentially greater, as a result, it becomes impossible to decode within a practical time. For that reason, at present, the key lengths of more than 1024 bits in RSA cryptography, more than 160 bits in elliptic curve cryptography, and more than 1024 bits in ElGamal encryption are requested.

However, in the case where the key lengths of the public keys and the secret keys are made longer, there has been needed a great deal of time for encryption by multiplication processing using public key and for decryption by multiplication processing using secret key. In this case, in order to shorten the processing time, it is necessary to provide an arithmetic means for high speed multiplication processing resulting in the increase in cost for enhancing security.

On the other hand, in real life, the data which flows in telecommunication lines varies in importance all the way from data which requires advanced security due to its high utility value to data which requires no security due to its low utility value.

Therefore, there is no need to encrypt any data with equivalent security. The data which requires high security uses the public key and the secret key of long key length, and the data which does not require high security uses the public key and the secret key of short key length.

Moreover, in apparatuses having the capability of performing high speed arithmetic operations, such as personal computers and the like, an encryption using the public key and the secret key of as long key length as possible is employed, and in apparatuses having the poor capability of arithmetic operations, such as mobile phones, IC cards and the like, an encryption using the public key and the secret key of comparatively short key length is employed, thereby, transmission and reception of data is carried out within a range of assured security.

In particular, in electronic computers, such as personal computers, the public key and the secret key having a plurality of kinds of key lengths are available. Moreover, an encryption method which changes key length according to security based on transmitted data, or according to capability of multiplication processing in a transmission destination apparatus is employed. And, ideas of making the key length available for versatility have been proposed (refer to, for example, JP-A-2001-051832).

However, since an extension field required for arithmetic operations such as multiplication processing is usually restricted to a predetermined extension field in accordance with the determination of the key length, in the case where the key length is made available for versatility, the extension fields for each key length must be prepared in advance. Therefore, the more the versatility of the key length is enhanced, the larger the size of the memory area required for storing the extension fields corresponding to the key length becomes.

Therefore, in real life, due to the restriction of the size of the memory area to be prepared in practice, only three to five kinds of the key lengths are prepared, and hence, the versatility of the key length is not necessarily provided sufficiently. As a result, in the case of situations where security is not assured sufficiently with these public keys and secret keys having key length prepared in practice, it is not possible to further enhance security.

Furthermore, since in conventional multiplication processing for encryption or decryption, a computation of polynomial residue operation is required after a computation of polynomial product, it is not possible to start the computation of polynomial residue operation until the computation of polynomial product terminates. Therefore, in the case where such multiplication processing is implemented with arithmetic circuits, there also arises a problem that it is difficult to parallelize the arithmetic circuits and hard to increase a processing speed.

The inventors, in view of the present situation, have made a study to make it possible to construct encryption and decryption systems of improved convenience by enabling to perform multiplication processing at high speed while allowing the selection of arbitrary key lengths, and have made the invention.

SUMMARY OF THE INVENTION

According to a first aspect of the present invention, there is provided a computer-readable recording medium recording a program for encryption/decryption which, letting a prime number p be a characteristic and two elements $A=\{a_0, a_1, a_2, \ldots, a_{m-1}\}$ and $B=\{b_0, b_1, b_2, \ldots, b_{m-1}\}$ in an extension field $F_{p^m}$ of extension degree m be plaintext data and an encryption key, or ciphertext data and a decryption key, generates an element $C=\{c_0, c_1, c_2, \ldots, C_{m-1}\}$ of the ciphertext data by multiplying the plaintext and the encryption key, or generates an element $C=\{c_0, c_1, c_2, \ldots, c_{m-1}\}$ of the plaintext data by multiplying the ciphertext data and the decryption key using an electronic computer. The encryption/decryption program comprises a first step of determining a positive integer k satisfying conditions that km+1 is a prime number and p is a primitive element in $F_{km+1}$, a second step of multiplying the two elements A and B, regarding the elements A and B as two elements in an extension field $F_{p^{km}}$ of extension degree km with a prime number p as characteristic using the positive integer k and a third step of obtaining a result of multiplication in an element of the extension field $F_{p^m}$ of extension degree m which is a subfield of $F_{p^{km}}$, using the result of multiplication obtained in the second step.

Furthermore, the computer-readable recording medium is characterized in that
letting $0 \leq i \leq m-1$, $0 \leq j \leq k-1$,
$<x>$ denoting x mod(km+1)
the second step includes:
a step of obtaining respective K[t], where $<p^{mt}>=K[t]$, for $0 \leq t \leq k-1$;
a step of setting $0=q[<i>]$ respectively for
a step of obtaining $a_i b_i$ mod $p=q[<p^i>]$ respectively for $0 \leq i \leq m-1$; and
a step of obtaining $(a_i-a_j)(b_i-b_j)$ mod $p=M$ respectively for $0 \leq i < j \leq m-1$ and adding M to $q[<p^i+(p^jK[t])>]$ respectively for $0 \leq t \leq k-1$,
the third step includes:
a step of adding $q[<(p^iK[t])>]$ to $q[<p^i>]$ respectively for $0 \leq i \leq m-1$; $1 \leq t \leq k-1$; and
a step of obtaining $kq[<0>]-q[<p^i>]=c_i$ respectively for $0 \leq i \leq m-1$.

Furthermore, the computer-readable recording medium is characterized in that
in the case where k=2k',
letting k' be a positive integer satisfying a condition that in a finite field $F_{2k'm+1}$, p is a primitive element or an order of p is k'm and k'm is an odd number,
letting $0 \leq i \leq m-1$, $0 \leq j \leq 2k'-1$,
$<x>$ denoting x mod(2k'm+1),
the second step includes:
a step of obtaining respective K[t], where $<p^{mt}>=K[t]$ for $0 \leq t \leq k'-1$;
a step of setting $0=q[<i>]$ respectively for $0 \leq i \leq 2k'm$,
a step of obtaining $a_i b_i$ mod $p=q[<p^i>]$ respectively for $0 \leq i \leq m-1$; and
a step of obtaining $(a_i-a_j)(b_i-b_j)$ mod $p=M$ respectively for $0 \leq i < j \leq m-1$ and adding M to $q[<p^i+(p^jK[t])>]$ and also adding M to $q[<p^i-(p_jK[t])>]$ respectively for $0 \leq t \leq k'-1$,
the third step includes:
a step of adding $q[<(p^iK[t])>]$ to $q[<p^i>]$ and also adding $q[<-(p^iK[t])>]$ to $q[<p^i>]$ respectively for $0 \leq i \leq m-1$, $1 \leq t \leq k'-1$; and
a step of obtaining $-q[<p^i>]=c_i$ respectively for $0 \leq i \leq m-1$.

According to a second aspect of the present invention, there is provided an apparatus for encryption/decryption having an arithmetic part which, letting two elements $A=\{a_0, a_1, a_2, \ldots, a_{m-1}\}$ and $B=\{b_0, b_1, b_2, \ldots, b_{m-1}\}$ in an extension field $F_{p^m}$ of extension degree m with a prime number p as characteristic be plaintext data and an encryption key, or ciphertext data and a decryption key, encrypts by means of generating an element $C=\{c_0, c_1, c_2, \ldots, c_{m-1}\}$ of ciphertext data by multiplying the plaintext and the encryption key, or decrypts by means of generating an element $C=\{c_0, c_1, c_2, \ldots c_{m-1}\}$ of plaintext data by multiplying the ciphertext data and the decryption key. The apparatus for encryption/decryption comprises:
a first memory part which is configured to store the elements respectively;
a second memory part which is configured to store the extension degree m;
a third memory part which is configured to store a positive integer k satisfying conditions that km+1 is a prime number and p is a primitive element in $F_{km+1}$, which is determined based on arithmetic operations performed by the arithmetic part;
a fourth memory part which is configured to store a result of multiplication processing performed by the arithmetic part, regarding the two elements A and B as two elements in an extension field $F_{p^{km}}$ of extension degree m with a prime number p as characteristic using the positive integer k; and
a fifth memory part which is configured to store a result of multiplication in an element in the extension field $F_{p^m}$ of extension degree m which is a subfield of $F_{p^{km}}$, the result of multiplication being obtained by means of predetermined arithmetic operations performed by the arithmetic part using the result of multiplication in an element in the extension field $F_{p^{km}}$ of extension degree km.

Furthermore, the apparatus for encryption/decryption is characterized in that,
letting $0 \leq i \leq m-1$, $0 \leq j \leq k-1$,
$<x>$ denoting x mod(km+1),
the fourth memory part includes:
a memory for storing respective K[t] where $<p^{mt}>=K[t]$ for $0 \leq t \leq k-1$;
a memory for storing $q[<i>]$ set by $0=q[<i>]$ respectively for $0 \leq i \leq km$;
a memory for storing $q[<p^i>]$ obtained by $a_i b_i$ mod $p=q[<p^i>]$ respectively for $0 \leq i \leq m-1$;
a memory for storing M obtained by $(a_i-a_j)(b_i-b_j)$mod $p=M$ respectively for $0 \leq i < j \leq m-1$; and
a memory for storing $q[<p^i+(p^jK[t])>]$ added by M respectively for $0 \leq t \leq k-1$, and
the fifth memory part includes:
a memory for storing $q[<p^i>]$ added by $q[<(p^jK[t])>]$ respectively for $0 \leq i \leq m-1$, $1 \leq t \leq k-1$; and a memory for storing $c_i$ obtained by $Kq[<0>]-q[<p^i>]=c_i$ respectively for $0 \leq i \leq m-1$.

Furthermore, the apparatus for encryption/decryption is characterized in that, in the case where $k=2k'$, the apparatus for encryption/decryption includes a memory part which, letting a positive integer $k'$ be such that in a finite field $F_{2k'm+1}$, p is a primitive element or an order of p is $k'm$ and $k'm$ is an odd number, stores the positive integer $k'$, letting $0 \leq i \leq m-1$, $0 \leq j \leq 2k'-1$ $<x>$ denoting x $\mod(2k'm+1)$, the fourth memory part includes:

a memory for storing respective K[t] where $<p^{mt}>=K[t]$ for $0 \leq t \leq k'-1$;

a memory for storing $q[<i>]$ set by $0=q[<i>]$ respectively for $0 \leq i \leq 2k'm$, a memory for storing $q[<p^i>]$ obtained by $a_i b_i \mod p=q[<p^i>]$ respectively for $0 \leq i \leq m-1$;

a memory for storing M obtained by $(a_i-a_j)(b_i-b_j) \mod p=M$ respectively for $0 \leq i < j \leq m-1$; and, a memory for storing $q[<p^i+(p^jK[t])>]$ added by M, and also storing $q[<p^i-(p^jK[t])>]$ added by M respectively for $0 \leq t \leq k'-1$, and the fifth memory part includes:

a memory for storing $q[<p^i>]$ added by $q[<(p^iK[t])>]$, and also storing $q[<p^i>]$ added by $q[<-(p^iK[t])>]$ respectively for $0 \leq i \leq m-1$, $0 \leq t \leq k'-1$; and a memory for storing $c_i$ obtained by $-q[<p^i>]=c_i$ respectively for $0 \leq i \leq m-1$.

According to a third aspect of the present invention, there is provided an apparatus for multiplication processing having an arithmetic part generates an element $C=\{c_0, c_1, c_2, \ldots, c_{m-1}\}$, by multiplying two elements $A=\{a_0, a_1, a_2, \ldots, a_{m-1}\}$ and $B=\{b_0, b_1, b_2, \ldots, b_{m-1}\}$ in an extension field $F_{p^m}$ of extension degree m with a prime number p as characteristic. The apparatus for multiplication processing in an extension field comprises:

a first memory part which is configured to store the elements respectively;

a second memory part which is configured to store the extension degree m;

a third memory part which is configured to store a positive integer k determined such that km+1 is a prime number and p is a primitive element in $F_{km+1}$ based on arithmetic operations performed by the arithmetic part;

a fourth memory part which is configured to store a result of multiplication processing performed by the arithmetic part, regarding the two elements A and B as two elements in an extension field $F_{p^{km}}$ of extension degree m with a prime number p as characteristic using the positive integer k; and a fifth memory part, which is configured to store a result of multiplication in an element in the extension field $F_{p^m}$ of extension degree m which is a subfield of $F_{p^{km}}$, the result of multiplication being obtained by means of predetermined arithmetic operations performed by the arithmetic part using the result of multiplication in an element in the extension field $F_{p^{km}}$ of extension degree km.

Advantage of Invention

According to the present invention, when an element $C=\{c_0, c_1, c_2, \ldots, c_{m-1}\}$ is generated, by multiplying two elements $A=\{a_0, a_1, a_2, \ldots, a_{m-1}\}$ and $B=\{b_0, b_1, b_2, \ldots, b_{m-1}\}$ in an extension field $F_{p^m}$ of extension degree m with a prime number p as characteristic, arithmetic operations are performed assuming an extension field $F_{p^{km}}$ as a definition field using a positive integer k which satisfies conditions that km+1 is a prime number and p is a primitive element in $F_{km+1}$, thereby, it is possible to select an extension degree m of an arbitrary integer.

That is, for an arbitrary extension degree m, it is quite easy to prepare an extension field required for arithmetic operations by constructing an extension field of extension degree km using a positive integer k satisfying conditions that km+1 is a prime number and p is a primitive element in $F_{km+1}$ therefore, there is no need to prepare extension fields corresponding to the extension degree m, and hence it is possible to select the extension degree m without limitation.

This extension degree m is a key length in encryption and decryption, since an arbitrary key length can be selected, it is possible to make security of ciphertext data arbitrarily selectable as needed. If it is required to increase security, what is needed is only to make the extension degree m as large as possible. Therefore, it is quite easy to deal with acts of decoding ciphertext data.

Furthermore, by using an extension field of extension degree km as a definition field, it is possible to break multiplication processing into repeated operations of addition or subtraction of predetermined element and multiplication. Therefore, it is easy to parallelize multiplication processing, enabling high speed arithmetic operations.

Furthermore, in the case of using k' where $k=2k'$, it is possible to reduce the number of repeated operations of addition or subtraction of predetermined element and multiplication, enabling further speeding up of arithmetic operations.

DESCRIPTION OF THE PREFERRED EMBODIMENTS

According to a program for encryption/decryption, an apparatus for encryption/decryption and an apparatus for multiplication in an extension field of the present invention, in generating an element $C=\{c_0, c_1, c_2, \ldots, c_{m-1}\}$ using an extension field with prime number characteristic p as a definition field by multiplying two elements $A=\{a_0, a_1, a_2, \ldots, a_{m-1}\}$ and $B=\{b_0, b_1, b_2, \ldots, b_{m-1}\}$ in an extension field $F_{p^m}$ of extension degree m, the multiplication is performed using an extension field $F_{p^{km}}$ of extension degree km with prime number characteristic p as a new definition field using a positive integer k-satisfying conditions that km+1 is a prime number and p is a primitive element in $F_{km+1}$ corresponding to the extension degree m, and using the result of multiplication in the extension field $F_{p^{km}}$ of extension degree km, a result of multiplication in the extension field $F_{p^m}$ of extension degree m which is a subfield of $F_{p^{km}}$ is obtained.

That is, with the use of a positive integer k satisfying conditions that km+1 is a prime number and p is a primitive element in $F_{km+1}$ corresponding to an arbitrary extension degree m, it is possible to use an extension field $F_{p^{km}}$ of extension degree km which has the extension field $F_{p^m}$ of extension degree m with prime number characteristic p as a subfield thereof as a definition field and hence, multiplication of two elements A and B can be performed even when an extension degree m and characteristic p are set to arbitrary values.

Here, an extension degree m corresponds to a key length in encryption and decryption. A capability of selecting an arbitrary extension degree m implies a capability of selecting an arbitrary key length and hence, it is possible to generate ciphertext data with an appropriate key length as needed.

Therefore, by selecting a key length depending on a situation, it is possible to generate ciphertext data with an appropriate key length, while adjusting a balance between the security of the ciphertext data and a load of arithmetic operations in encryption and decryption.

For example, when 500-bit prime number of characteristic $p=2^{500}-863$ is used, combinations each of which is formed of an extension degree m, a positive integer parameter k and a key length can be selected, as shown in a following table.

TABLE 1

| extension degree m | 2 | 3 | 4 | 5 | ... |
|---|---|---|---|---|---|
| parameter k | 1 | 2 | 1 | 2 | ... |
| key length (bits) | 1000 | 1500 | 2000 | 2500 | ... |

Here, with the use of a combination which can make the key length short, an operation speed of encryption and decryption can be enhanced. On the other hand, with the use of a combination which can make the key length long, it is possible to enhance security by generating ciphertext data which is difficult to decode.

In particular, the extension degree m can be set as an arbitrary positive integer, and can also be set as a large value as much as possible. Also, the characteristic p can be an arbitrary prime number.

Here, a key required for encryption can be safely transferred using Diffie-Hellman key exchange algorism.

That is, assuming a case where Alice and Bob exchange their keys, firstly, Alice sends g, $A=g^a \in F_{p^m}$ to Bob as key data.

On receiving A, Bob calculates $C=A^b=g^{ab} \in F_{p^m}$ and calculates $B=g^b \in F_{p^m}$ and sends $B=g^b$ to Alice.

Alice, on receiving B, by calculating $C=B^a=g^{ab} \in F_{p^m}$, can share the key gab with Bob, without transmitting the key gab over a network connecting Alice and Bob.

Moreover, in case of keys which are used for authentication data in IC cards, by storing key data in IC cards in advance when they are made, keys can be shared without transmitting keys over a network.

Or, in the case of general public key cryptography, when Bob receives required data from Alice, Bob discloses his public key in advance.

For example, when the general public key cryptography is ElGamal encryption, Bob calculates g, $B=g^s \in F_{p^m}$ using his secret key s and makes them public.

Alice who sends a message M downloads Bob's public key data g, B and encrypts the message M by calculating, $C_1 = M \times B^t$, $C_2 = g^t$, where $t$ is a random number.

Moreover, in this calculation of $C_1$, a program for encryption/decryption and an apparatus for encryption/decryption or an apparatus for multiplication in an extension field of the present invention, described later, are used.

Alice sends $C_1$, $C_2$ to Bob, and Bob decrypts the message M by calculating $C_1/C_2^s$ using received $C_1$, $C_2$. That is, $C_1/C_2^s = MB^t/g^{ts} = Mg^{ts}/g^{ts} = M$.

Also, in this decryption processing, a program for encryption/decryption and an apparatus for encryption/decryption or an apparatus for multiplication in an extension field of the present invention, described later, are used.

Since decryption processing of a message M can only be performed by Bob having s secretly in this manner, there is no need to share one password between Alice and Bob as in a symmetric cryptography. As a result, the use of key length by which security is ensured can bring about high reliability.

Figure 1:
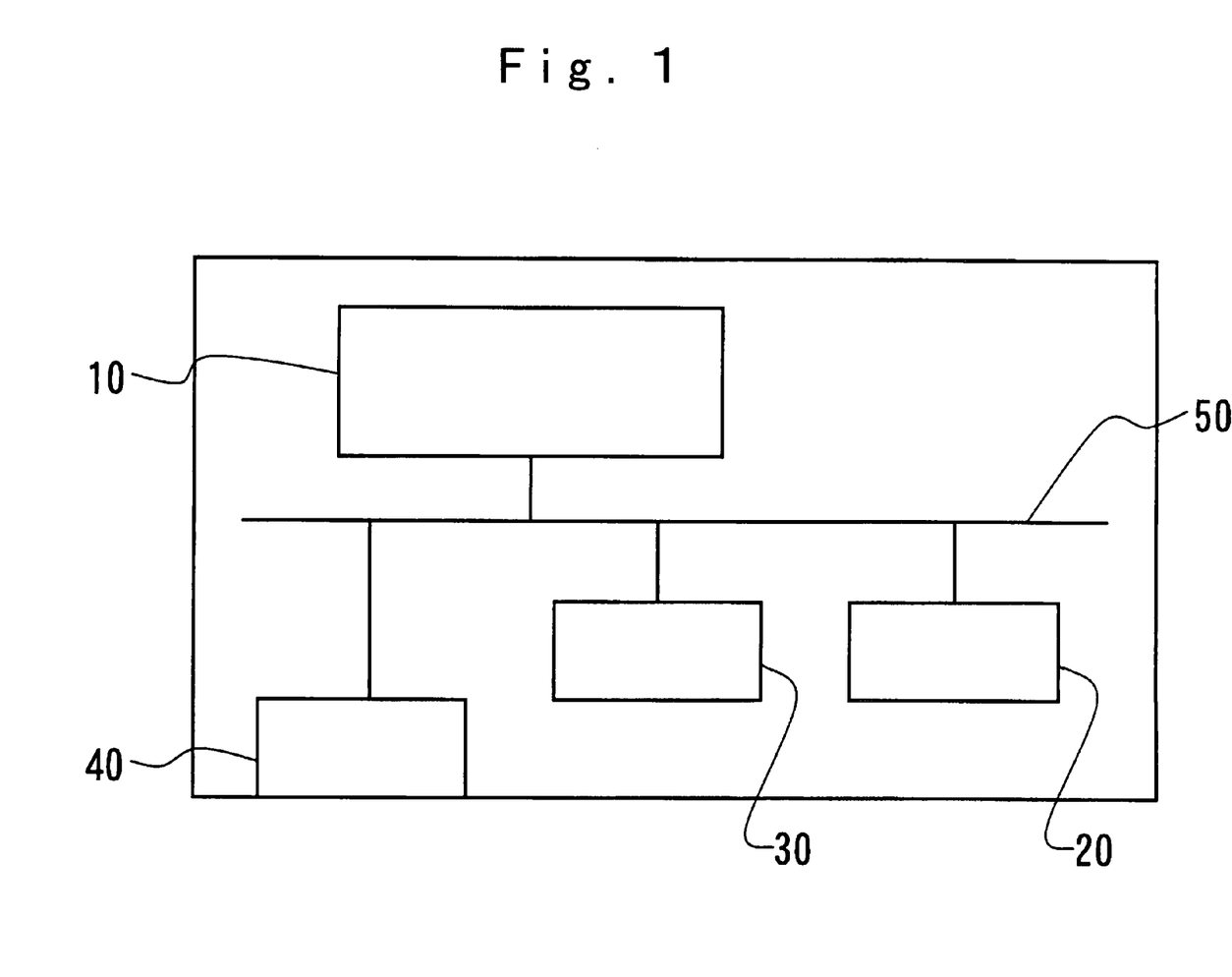
FIG. 1 is a block diagram of an apparatus for encryption/decryption according to the present invention.

FIG. 1 is a block diagram of an apparatus for encryption/decryption according to an embodiment of the present invention. The apparatus for encryption/decryption also constitutes an apparatus for multiplication in an extension field.

The apparatus for encryption/decryption includes an arithmetic part 10 such as a CPU (Central Processing Unit), a non-volatile memory part 20 which is configured to store a program executed by the arithmetic part 10, a volatile memory part 30 which is configured to temporarily store required data in accordance with execution of the program. The non-volatile memory part 20 is constituted of a non-volatile storage unit such as a ROM (Read Only Memory) or a hard disk, and the volatile memory part 30 is constituted of a so-called RAM (Random Access memory).

In particular, the volatile memory part 30 includes a plurality of registers, and the respective registers store desired data.

The non-volatile memory part 20 stores a program for encryption/decryption according to the embodiment of the present invention. By initiating the program for encryption/decryption and by expanding the program for encryption/decryption on the volatile memory part 30 as needed, an arithmetic operation for encryption/decryption is performed.

Furthermore, the apparatus for encryption/decryption includes a data input/output part 40. A value of an arbitrary extension degree m can be inputted to the apparatus for encryption/decryption via the data input/output part and encryption processing can be performed based on a value of an inputted extension degree m. Alternatively, not only a value of an extension degree m but also a value of a characteristic p can be changed.

And, the data input/output part 40 performs outputting of key data which becomes a public key and inputting or outputting of ciphertext data. In FIG. 1, numeral 50 indicates a data bus.

The arithmetic part 10 may allow the non-volatile memory part 20 to store required key data, a value of p, an extension degree m and the like stored in the volatile memory part 30.

The apparatus for encryption/decryption or the apparatus for multiplication in an extension field is not limited to an electronic commuter or the like which executes encryption/decryption program in the above mentioned manner. That is, an arithmetic device having an arithmetic circuit which performs arithmetic operations corresponding to the encryption/decryption program may be used to upgrade the speed of arithmetic operations.

Hereinafter, a multiplication operation of two elements in encryption or decryption is described.

Firstly, as a first embodiment of the present invention, an arithmetic operation for acquiring a product of elements A and B under the following condition is described. Here, when this operation for acquiring the product is performed for encryption, one of the elements A and B is an encryption key and the other is plaintext data of unit length which is split into pieces in key lengths of the encryption key. When this product operation is performed for decryption, one of the elements A and B is a decryption key and the other is ciphertext data of unit length which is split into pieces in key lengths of the decryption key.

Assume an extension field with a prime number p as characteristic as a definition field.

Assume an appropriate positive integer k, for an extension degree m, be such that km+1 is a prime number and p is a primitive element in $F_{km+1}$.

Let $0 \leq i \leq m-1$, $0 \leq j \leq k-1$.

$<x>$ denotes x mod(km+1).

Let ω be a primitive (km+1)-th root of unity.

Let $\{a_0, a_1, a_2, \ldots, a_{m-1}\}$ be an element A in an extension field $F_{p^m}$ of extension degree m.

$$A = \sum_{i=0}^{m-1} a_i \left( \sum_{j=0}^{k-1} \omega^{<p^i+mj>} \right) = \sum_{i=0}^{m-1} a_i \gamma^{p^i} \quad [E1]$$

$$\gamma = \sum_{j=0}^{k-1} \omega^{<p^{mj}>}$$

Let $\{b_0, b_1, b_2, \ldots, b_{m-1}\}$ be an element B in an extension field $F_{p^m}$ of extension degree m.

$$B = \sum_{i=0}^{m-1} b_i \left( \sum_{j=0}^{k-1} \omega^{<p^i+mj>} \right) = \sum_{i=0}^{m-1} b_i \gamma^{p^i} \quad [E2]$$

In addition, it is a generally proven fact that, for an arbitrary positive integer m, there exists a positive integer k satisfying that km+1 is a prime number at least in a range of k<m. The positive integer k can be easily found by using a dedicated program determining a positive integer k.

Usually, a product C=AB of the elements A and B is calculated by CVMA (Cyclic Vector Multiplication Algorithm). Since the product C of the elements A and B is also an element in a subfield $F_{p^m}$ due to the closure of arithmetic operations in a subfield, vector coefficients of base vector ω' and ω" are equal also in vector representation of the product C.

Here, for convenience of notation, $$\omega' = \omega^{<p^i>}$$

and $$\omega'' = \omega^{<p_{i+mj}>}.$$

Therefore, what is required to obtain is only respective coefficients $c_i$ of ω' for $0 \leq i \leq m-1$. Assuming, $$C = \sum_{i=0}^{m-1} c_i \left( \sum_{j=0}^{k-1} \omega^{<p^i+mj>} \right) = \sum_{i=0}^{m-1} c_i \gamma^{p^i} \quad [E5]$$

Figure 2:
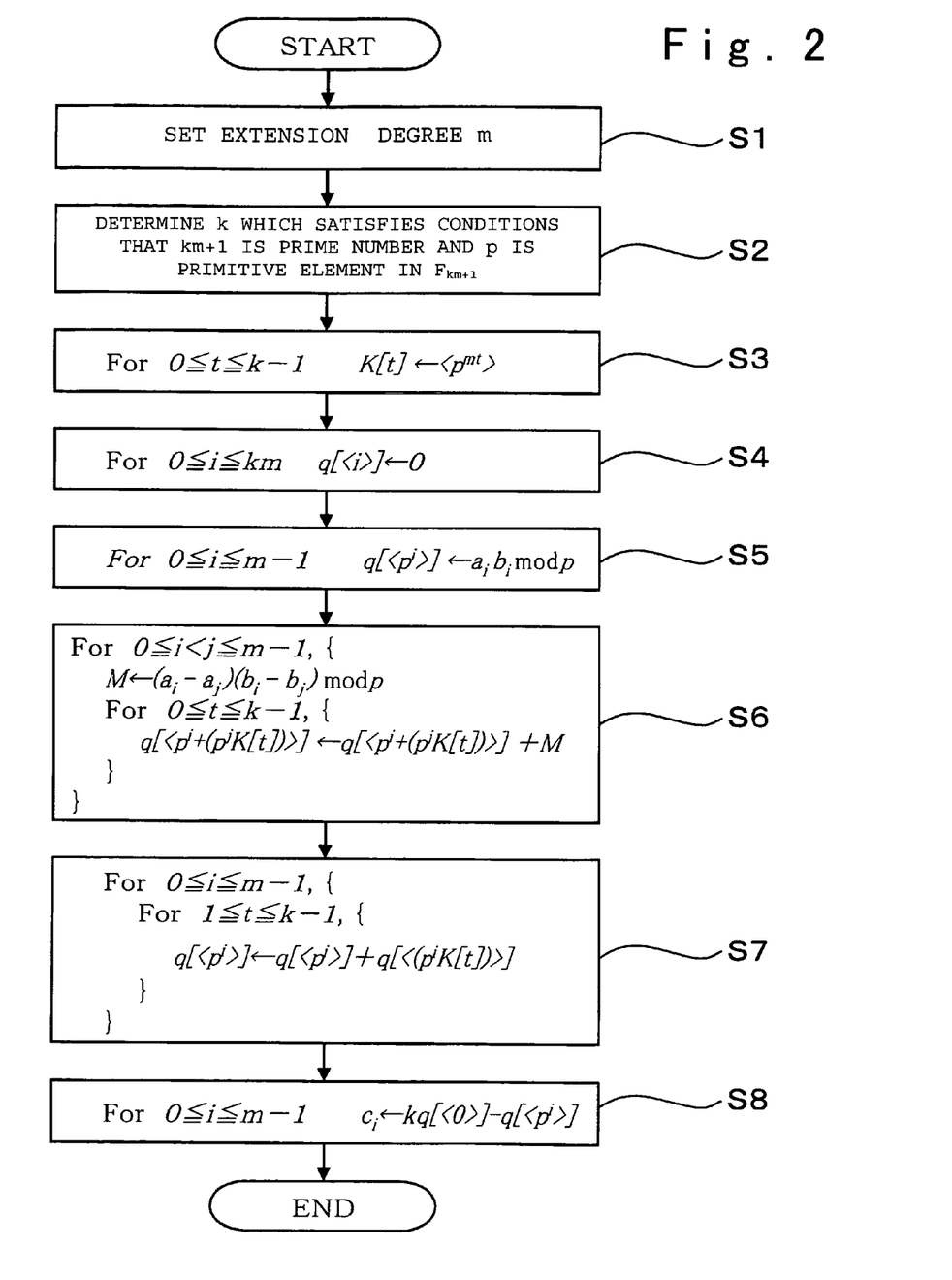
FIG. 2 is a flow chart of a program for encryption/decryption according to the present invention.

Each coefficient Ci can be obtained by arithmetic operations in an electronic computer such as a personal computer and the like, based on an encryption/decryption program shown in a flowchart in FIG. 2.

However, in this case, it is not possible to directly construct an extension field where 8p|m(p−1).

Consequently, in the case of constructing the extension field where 8p|m(p−1), it can be made possible to deal with the extension fields where 8p|m(p−1) by dividing the extension degree m into even number factor $m_E$ and odd number factor $m_O$ and extending respective extension fields successively. In addition, in some cases, there may be required to use the extension field in combination with a second embodiment described later.

In the case of encryption, firstly an electronic computer sets an extension degree m (step S1). In addition, in the case of decryption, the electronic computer can determine an extension degree m from a key length of a public key or a secret key.

Next, the electronic computer determines a positive integer k satisfying conditions that km+1 is a prime number and p is a primitive element in $F_{km+1}$ using a dedicated program based on the set extension degree m(step S2). In addition, as described above, it is possible to determine at least one positive integer k satisfying that km+1 is a prime number within a range of k<m, the electronic computer can terminate a determination processing in a comparatively short time.

Next, the electronic computer obtains respective K[t] where $<pmt> = K[t]$ for $0 \leq t \leq k-1$ (step S3), and sets $0 = q[<i>]$ respectively for $0 \leq i \leq km$ (step S4).

Next, the electronic computer obtains $a_i b_i$ mod $p = q[<p^i>]$ respectively for $0 \leq i \leq m-1$ (step S4), after that, obtains $(a_i - a_j)(b_i - b_j)$ mod $p = M$ respectively for $0 \leq i < j \leq m-1$, and adds M to $q[<p^i> + (p^j K[t])>]$ respectively for $0 \leq t \leq k-1$ (step S6).

After that, the electronic computer, in processing of using an extension field of extension degree km, not an extension field $F_{p^m}$ of extension degree m, as a definition field, adds $q[<(p^i K[t])>]$ to $q[<p^i>]$ respectively for $0 \leq i \leq m-1$, (step S7), and finally, obtains $Kq[<0>] - q[<p^i>] = c_i$ respectively for $0 \leq i \leq m-1$ (step S8).

In this way, since $c_i$ can be obtained by arithmetic operations broken into a repetition of addition or subtraction of predetermined element and multiplication in the extension field $F_{p^{km}}$ of extension degree km, and the operations are easy to be parallelized, it becomes possible to implement high speed arithmetic operations.

In particular, since a load in arithmetic operations is small, even devices having poor arithmetic function such as mobile phones and IC cards can easily perform multiplication processing. Furthermore, it becomes possible to make a key length of a public key and a secret key changeable.

Furthermore, the arithmetic operations in multiplication processing may be implemented by a semiconductor device for multiplication processing which is formed on a semiconductor substrate as an arithmetic circuit, it is possible to further upgrade the speed of encryption and decryption by employing an apparatus for encryption/decryption having the semiconductor device for multiplication processing. Moreover, the parallelization is possible to further speed up. And, semiconductor device for multiplication processing may also be employed as an apparatus for multiplication in an extension field.

That is, the semiconductor device for multiplication processing forms on a semiconductor substrate an arithmetic unit to enable to perform required arithmetic operations, together with the following registers and a group of registers as respective memory parts.

A register for storing a characteristic p.

A register for storing an extension degree m.

A group of registers for storing an element A in an extension field $F_{p^m}$ based on extension degree m.

A group of registers for storing an element B in an extension field $F_{p^m}$ based on extension degree m.

A register for storing a positive integer k determined corresponding to an extension degree m which has been set.

A group of registers for storing respective K[t] where $<pmt> = K[t]$ for $0 \leq t \leq k-1$.

A group of registers for storing q[<i>] set by 0=q[<i>] respectively for 0≦i≦km-1.

A group of registers for storing q[<$p^i$>] obtained by $a_i b_i$ mod p=q[<$p^i$>] respectively for 0≦i≦m-1.

A group of registers for storing M obtained by $(a_i-a_j)(b_i-b_j)$ mod p=M respectively for 0≦i<j≦m-1.

A group of registers for storing q[<$p^i$+($p^j$K[t])>] added by M respectively for 0≦t≦k-1.

A group of registers for storing q[<$p^i$> added by $p^j$K[t])>] respectively for 0≦t≦k-1.

A group of registers for storing $c_i$ obtained by Kq[<0>]−q[<$p^i$>]=$c_i$ respectively for 0≦i≦m1.

By including these registers and groups of registers, since each operation can be parallelized, it is possible to upgrade speeding up of multiplication processing by performing parallel processing. Therefore, it is possible to provide an apparatus for encryption/decryption or an apparatus for multiplication processing in an extension field enabling high speed encryption and decryption.

By mounting these semiconductor device for multiplication processing on a required populated board, it is possible to provide the populated board enabling high speed multiplication processing, and by configuring mobile phones and electronic computers with the populated board, it is possible to provide mobile phones and electronic computers and the like in which high speed encryption and decryption is possible and furthermore, key length of an public key and a secret key are freely changeable.

Hereinafter, as a second embodiment, a product operation of an element A and an element B under the following conditions is described. Here, a difference from the first embodiment is performing operations using k' in place of k where k=2k'. That is, Assume an extension field with a prime number p as characteristic as a definition field.

Assume an appropriate positive integer K', for an extension degree m, be such that 2k'm+1 is a prime number and in $F_{2k'm+1}$, p is a primitive element or an order of p is k'm and k'm is an odd number.

Let 0≦i≦m-1, 0≦j≦2k'-1.

<x> denotes x mod(2k'm+1).

Let ω be a primitive (2k'm+1)-th root of unity, and let τ=ω+$ω^{-1}$.

Let {$a_0, a_1, a_2, \ldots, a_{m-1}$} be an element A of an extension field $F_{p^m}$ of extension degree m.

$$A = \sum_{i=0}^{m-1} a_i \left( \sum_{j=0}^{k'-1} \tau^{<p^{i+mj}>} \right) = \sum_{i=0}^{m-1} a_i \gamma^{p^i} \quad [E6]$$

$$\gamma = \sum_{j=0}^{k'-1} \tau^{<p^{mj}>}$$

Let {$b_0, b_1, b_2, \ldots, b_{m-1}$} be an element B of an extension field $F_{p^m}$ of extension degree m.

$$B = \sum_{i=0}^{m-1} b_i \left( \sum_{j=0}^{k'-1} \tau^{<p^{i+mj}>} \right) = \sum_{i=0}^{m-1} b_i \gamma^{p^i} \quad [E7]$$

Since, due to the closure of an arithmetic operation in a subfield, a product C of the element A and the element B becomes an element of the subfield also in vector representation of the product C, vector coefficients of base vector τ' and τ" become equal.

Here, for convenience of notation, $$\tau' = \tau^{<p^i>}$$

and, $$\tau'' = \tau^{<p^{i+mj}>}.$$

Therefore, what is required to obtain is only coefficients $c_i$ of τ' for 0≦i≦m-1, assuming, $$C = \sum_{i=0}^{m-1} c_i \left( \sum_{j=0}^{k-1} \tau^{<p^i+mj>} \right) = \sum_{i=0}^{m-1} c_i \gamma^{p^i} \quad [E10]$$

Figure 3:
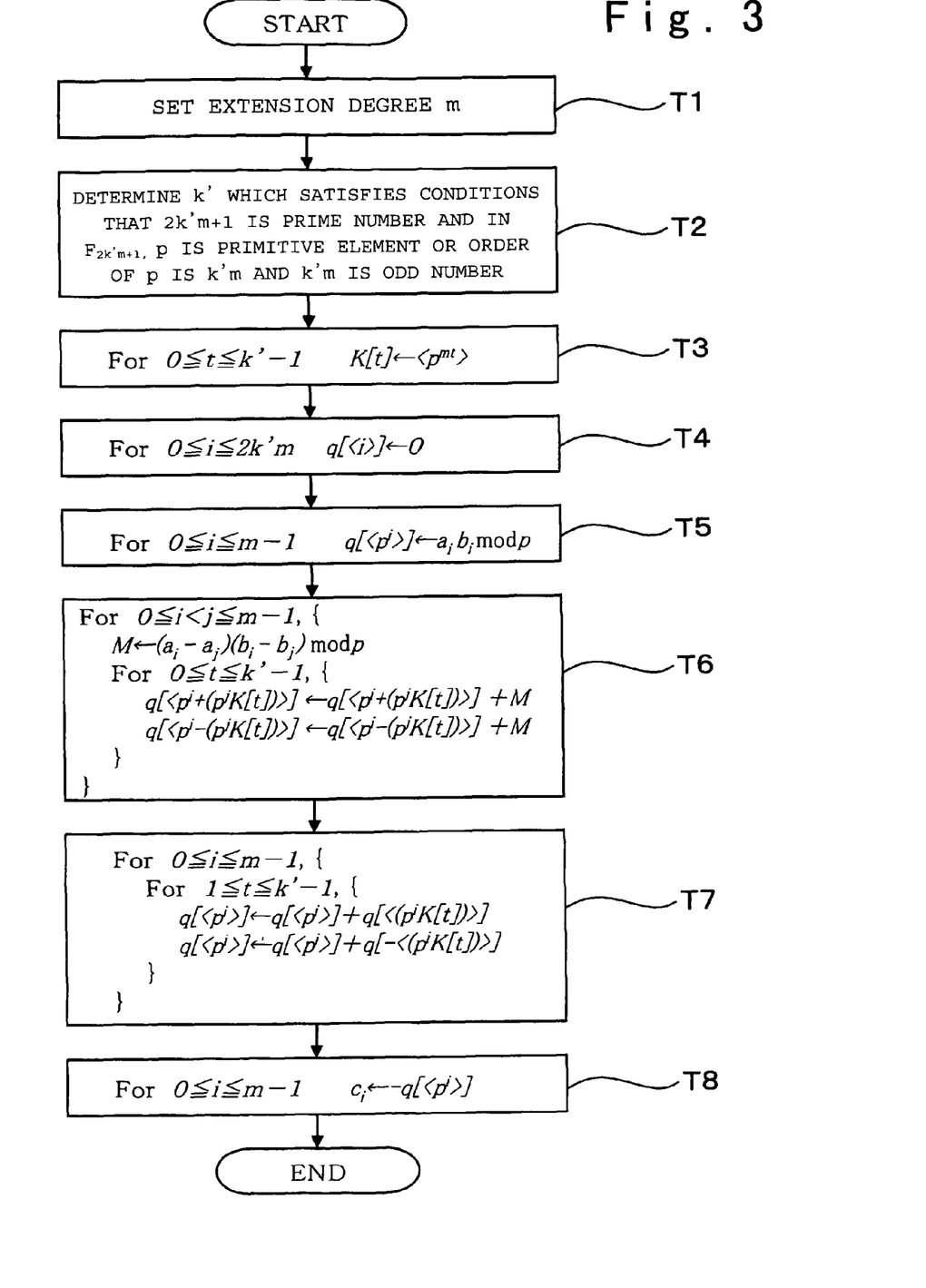
FIG. 3 is a flow chart of a program for encryption/decryption according to the present invention.

Each coefficient $c_i$ can be obtained by electronic computers such as personal computers and the like based on a program shown in a flowchart in FIG. 3.

However, in this case, it is not possible to construct an extension field where 4p|m(p−1). Therefore, in the case of constructing an extension field where 4p|m(p−1), it can be made possible to deal with extension fields where 4p|m(p−1) by dividing an extension degree m into even number factor $m_E$ and odd number factor $m_O$ (m=$m_E·m_O$), and extending respective extension fields successively. In addition, in some cases, there may be required to use the extension field in combination with the first embodiment described above.

In the case of encryption, firstly an electronic computer sets an extension degree m (step T1). In addition, in the case of decryption, the electronic computer determines an extension degree m from a key length of a public key or a secret key.

Next, the electronic computer determines an appropriate positive integer k' satisfying conditions that 2k'm+1 is a prime number and in $F_{2k'm+1}$, p is a primitive element or an order of p is k'm and k'm is an odd number, using a dedicated program based on the extension degree m which has been set (step T2). In addition, as described above, it is possible to determine at least one positive integer k' satisfying 2k'm+1 is a prime number within a range of 2k'<m, therefore, electronic computers can terminate a determination processing of a positive integer k' in a comparatively short time.

Next, the electronic computer obtains respective K[t] where <pmt>=K[t] for 0≦t≦k'-1 (step T3), and further, sets 0=q[<i>] respectively for 0≦i≦2k'm (step T4).

Next, the electronic computer obtains $a_i b_i$ mod p=q[<$p^i$>] respectively for 0≦i≦m-1 (step T5), after that, obtains $(a_i-a_j)(b_i-b_j)$ mod p=M respectively for 0≦i<j≦m-1, and adds M to q[<$p^i$>+($p^j$K[t])>] and adds M to q[<$p^i$>−($p^j$K[t])>] respectively for 0≦t≦k'-1 (step T6).

After that, the electronic computer, in processing of using an extension field $F_{pk'm}$ of extension degree k'm, not an extension field $F_{p^m}$ of extension degree m, as a definition field, adds q[<($p^i$K[t])>] to q[<$p^i$>] and adds q[<−($p^i$K[t])>] to q[<$p^i$>] respectively for 0≦i≦m-1, 1≦t≦k'-1 (step T7), and finally, obtains −q[<$p^i$>]=$c_i$ respectively for 0≦i≦m-1 (step T8).

In this way, since $c_i$ can be obtained by arithmetic operations which is broken into a repetition of addition or subtraction of predetermined element and multiplication, and the operations are easy to be parallelized, it becomes possible to implement high speed arithmetic operations.

In addition, the arithmetic operation in multiplication processing, shown in a flowchart in FIG. 3, may be implemented by a semiconductor device for multiplication processing which is formed on a semiconductor substrate as an arithmetic circuit, it is possible to further upgrade the speed of encryption and decryption by employing an apparatus for encryption/decryption having the semiconductor device for multiplication processing. Furthermore, the parallelization is possible to further speed up. And also, semiconductor device for multiplication processing may be employed as an apparatus for multiplication in an extension field.

In this case, the semiconductor device for multiplication processing forms on a semiconductor substrate, an arithmetic part to enable to perform required arithmetic operations, together with the following registers and a group of registers as respective memory parts.

A register for storing a characteristic p.

A register for storing an extension degree m.

A group of registers for storing an element A in an extension field $F_{p^m}$ based on extension degree m.

A group of registers for storing an element B in an extension field $F_{p^m}$ based on extension degree m.

A register for storing a positive integer k' determined corresponding to an extension degree m which has been set.

A group of registers for storing respective K[t] where <pmt>=K[t] for $0 \leq t \leq k'm-1$.

A group of registers for storing q[<i>], set by 0=q[<i>] respectively for $0 \leq i \leq 2k'm-1$.

A group of registers for storing q[<$p^i$>] obtained by $a_i b_i$ mod p=q[<$p^i$>] respectively for $0 \leq i \leq m-1$.

A group of registers for storing M obtained by $(a_i-a_j)(b_i-b_j)$ mod p=M respectively for $0 \leq i \leq j < m-1$.

A group of registers for storing q[<$p^i$+($p^j$K[t])>] added by M and also storing q[<$p^i$-($p^j$K[t])>] added by M respectively for $0 \leq t \leq k'-1$.

A group of registers for storing q[<$p^i$>] added by q[<($p^j$K[t])>] and also storing q[<$p^i$>] added by q[<-($p^j$K[t])>] respectively for $0 \leq i \leq m-1$, $1 \leq t \leq k'-1$.

A group of registers for storing ci obtained by -q[<$p^i$>]=ci respectively for $0 \leq i \leq m-1$.

By including these registers and groups of registers, since each operation can be parallelized in the same way as in the first embodiment, it is possible to upgrade the speeding up of a multiplication processing by performing parallel processing. Therefore, it is possible to provide an apparatus for encryption/decryption or an apparatus for multiplication in an extension field enabling high speed encryption and decryption.

Furthermore, let km+1 be a prime number, S be a cyclic multiplicative subgroup of order k in mod(km+1) and ω be a zero of AOP (all one polynomial) of degree km $(x^{km+1}-1)/(x-1)$. Using γ given by $$\gamma = \sum_{a \in S} \omega^a \qquad [E11]$$

consider the following set.

$$\{\gamma, \gamma^p, \ldots, \gamma^{p^{m-1}}\} \qquad [E12]$$

That a set in [E12] becomes a normal basis in an extension field $F_{p^m}$ is a necessary and sufficient condition that km/e and m are relatively prime. Here, e is an order of p modulo km+1.

The first and the second embodiment, described above, are applicable to multiplication processing using this normal basis.

That is,

Let e be an order of an element p in $F_{km+1}$.

Let e'=km/e.

Let $\epsilon \in F_{km+1}$ be a primitive k-th root of unity.

Let $\{a_0, a_1, a_2, \ldots, a_{m-1}\}$ be an element A in an extension field $F_{p^m}$ of extension degree m.

$$A = \sum_{i=0}^{m-1} a_i \gamma^{p^i} \qquad [E13]$$

Let $\{b_0, b_1, b_2, \ldots, b_{m-1}\}$ be an element B in an extension field $F_{p^m}$ of extension degree m.

$$B = \sum_{i=0}^{m-1} b_i \gamma^{p^i} \qquad [E14]$$

In this case, let a product C of the element A and the element B be $$C = AB = \sum_{i=0}^{m-1} c_i \gamma^{p^i} \qquad [E15]$$

Figure 4:
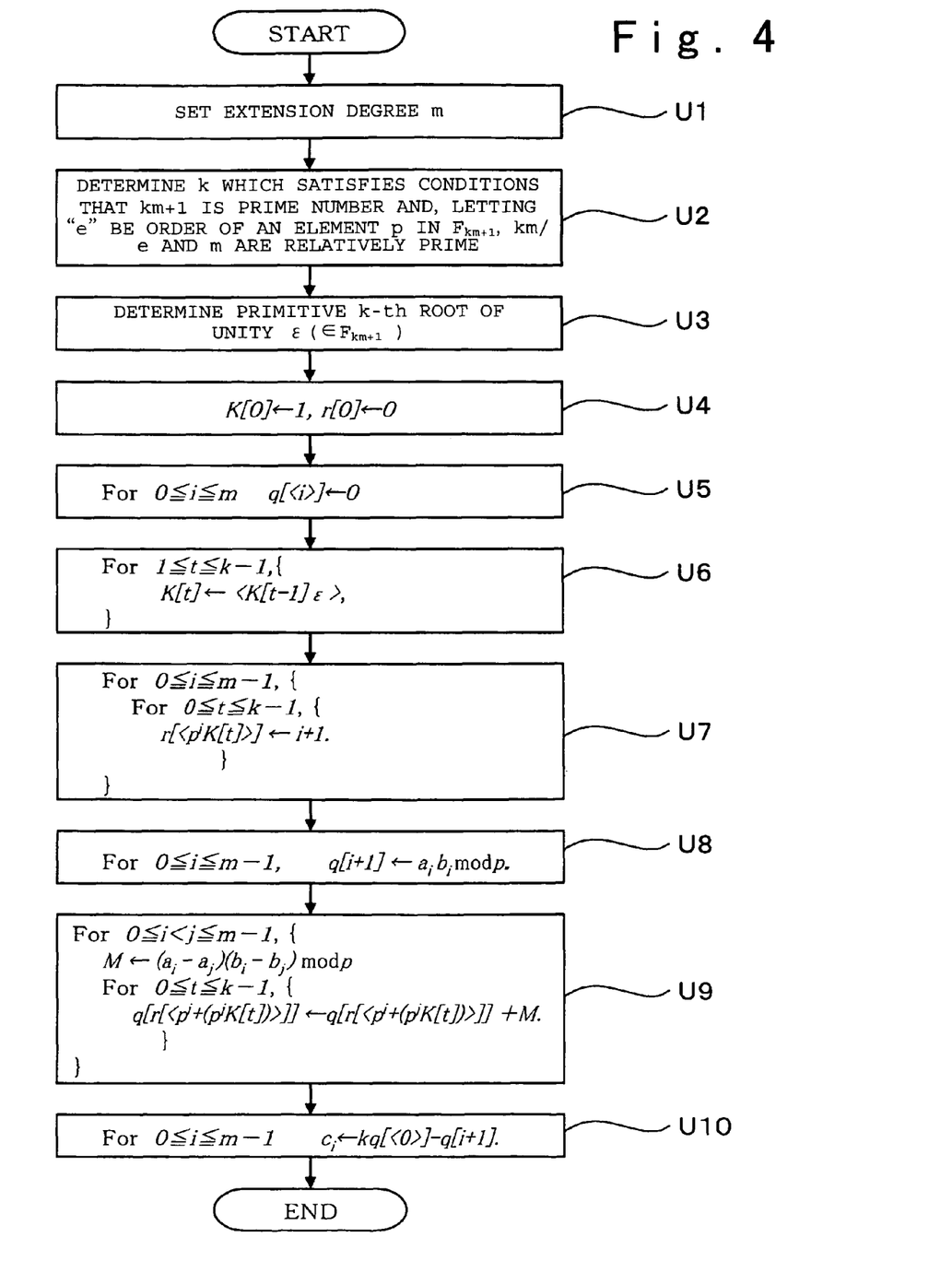
FIG. 4 is a flow chart in another embodiment.

Due to the closure of an arithmetic operation in a subfield, each coefficient $c_i$ can be obtained by arithmetic operations in electronic computers such as personal computers, based on a program shown in a flowchart in FIG. 4.

Here, in the case of encryption, firstly an electronic computer sets an extension degree m (step U1). In addition, in the case of decryption, the electronic computer determines an extension degree m from a key length of a public key or a secret key.

Next, the electronic computer determines an appropriate positive integer k satisfying conditions that km+1 is a prime number and, e'(=km/e) and m are relatively prime, using a dedicated program(step U2). A primitive k-th root of unity ε is determined in accordance with determination of the positive integer k (step U3).

Next, the electronic computer sets 1=K[0],0=r[0] (step U4).

Next, the electronic computer sets 0=q[<i>] for $0 \leq i \leq m$ (step U5).

Next, the electronic computer sets <K[t-1]ε>=K[t] for $1 \leq t \leq k-1$ (step U6).

Next, the electronic computer sets i+1=r[<$p^i$K[t]>] for $0 \leq i \leq m-1$, and $0 \leq t \leq k-1$ (step U7).

Next, the electronic computer obtains $a_i b_i$ mod p=q[i+1] respectively for $0 \leq t \leq m-1$ (step U8)

Next, the electronic computer obtains $(a_i-a_j)(b_i-b_j)$ mod p=M respectively for $0 \leq i < j \leq m-1$, and adds M to q[r[<$p^i$+($p^i$K[t])>]] respectively for $0 \leq t \leq k-1$ (step U9).

Finally, the electronic computer obtains Kq[<0>]-q[i+1]=$c_i$ respectively for $0 \leq i \leq m-1$ (step U10).

In addition, in the case where k is an even number, in step U9, the electronic computer can set kq[<0>]=0.

In this way, the embodiment is applicable to more normal bases. Furthermore, since a value of k can be made smaller, it is also possible to upgrade the speed of arithmetic operations by reduction of the number of arithmetic operations.

In addition, as described above, in some cases where m is a multiple of p such as 8p|m(p−1) or 4p|m(p−1), it is not possible to construct an extension field. However, it can be made possible to construct the extension field of odd characteristic p by dividing the extension degree m into even number factor $m_E$ and odd number factor $m_O$, and extending respective extension fields successively. Therefore, it is possible to eliminate the restriction described above.

That is, for example, in the case of constructing $F_{p^{4p}}$, firstly an extension field of $F_{p^4}$ is constructed and next, p-degree successive extension of $F_{p^4}$ is performed. Due to the fact that odd characteristic p and 4 are relatively prime, it is possible to construct an extension field denoted by $F_{p^{4p}}$. That is, it is possible to construct an extension field of an arbitrary odd characteristic and of an arbitrary degree.

The present invention, in a mathematical point of view, means that it is possible to perform multiplication and division in an extension field without preparing a modular polynomial as an irreducible polynomial.

From a different point of view, it is indicated that it is possible to generate irreducible polynomials of arbitrary degrees by adopting the idea of the present invention.

Here, for example, an element in $F_{p^4}$ having (1, 2, 1, 2) in vector representation is an element in $F_{p^2}$. Calling an element which is not included in a proper subfield an essential element, in the case where $\alpha$ is an essential element in $F_{p^m}$, if a minimal polynomial of $\alpha$, that is, an polynomial $M_\alpha(x)$ of minimal degree over $F_p$ having zero at $\alpha$ can be obtained, it becomes an irreducible polynomial of degree m over $F_p$.

In addition, $M_\alpha(x)$ is represented in the following expression.

$$M_\alpha(x) = (x-\alpha)(x-\alpha^p)\ldots(x-\alpha^{p^{m-1}}) = x^m + a_{m-1}x^{m-1} + \ldots + a_1 + a, a_0, a_1, a_2, \ldots, a_{m-1} \in F_p \quad [E16]$$

Here, consider the following computation expression.

$$a_{m-1} = -Tr(\alpha) \quad [E17]$$

$$a_i = (m-1)^{-1}\left\{-Tr(\alpha^{m-1}) + \sum_{j=1}^{m-1-i}(-1)^j a_{m-j}Tr(\alpha^{m-i-j})\right\} \quad [E18]$$

$$Tr(x) = x + x^p + x^{p^2} + \ldots + x^{p^{m-1}}$$

In the above expression, by calculating $a_i$ in order of $i=m-2, m-3, \ldots, 2, 1, 0$, an irreducible polynomial can be obtained.

Figure 5:
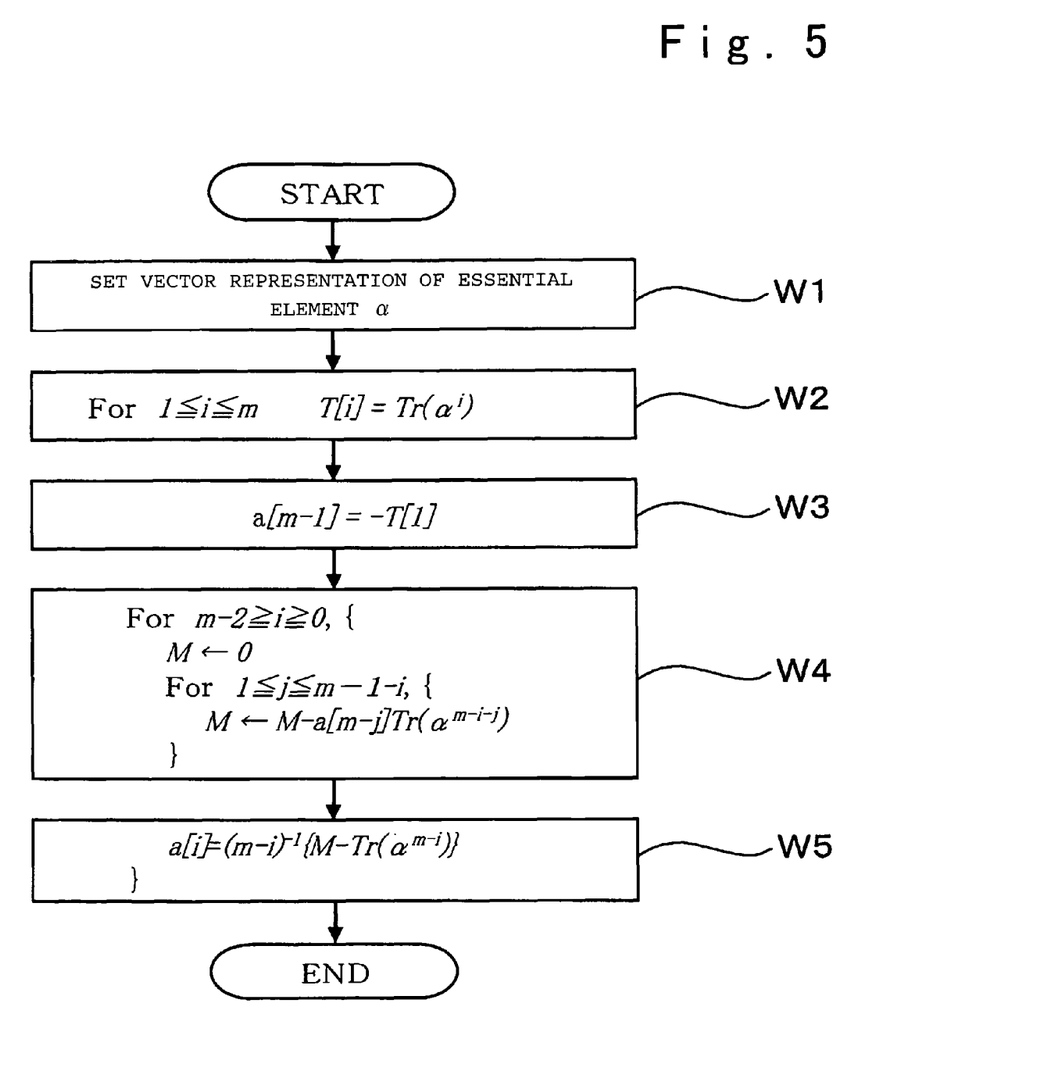
FIG. 5 is a flow chart of obtaining an irreducible polynomial.

That is, a minimal polynomial of an arbitrary essential element $\alpha$ in an extension field $F_{p^m}$ can be obtained based on a program shown in a flowchart in FIG. 5, as follows.

Firstly, an electronic computer sets a vector representation $(x_0, x_1, x_2, \ldots, x_{m-1})$ of an essential element a (step W1). Here, a minimal polynomial $M_\alpha(x)$ of an essential element $\alpha$ is represented in the following expression.

$$M_\alpha(x) = x^m + \sum_{i=0}^{m-1} a_i x^i \quad [E19]$$

Next, the electronic computer sets $T[i]=Tr(\alpha^i)$ for $1 \leq i \leq m$ (step W2), and sets $a[m-1]=-T[1]$ (step W3).

Next, the electronic computer sets $0=M$ for $m-2 \leq i \leq 0$, adds $-a[m-j]Tr(\alpha^{m-i-j})$ to M respectively for $1 \leq j \leq m-1-i$ (step W4).

Next, the electronic computer obtains $a[i]=(m-i)^{-1}\{M-Tr(\alpha^{m-i})\}$ (step W5).

Thus, it is possible to obtain an arbitrary irreducible polynomial with p>m. In addition, the processing described above may be used for determining a minimal polynomial relating to a subfield which is not a prime field $F_p$.

Enabling to obtain an arbitrary irreducible polynomial makes it possible to perform basis transformation between different definition fields.

In order to perform basis transformation, it is necessary to determine a transformation matrix. Here, supposing that there is an extension field $F'_{p^m}$ for which generating a transformation matrix is needed, an extension field $F_{p^m}$ which is isomorphic to $F'_{p^m}$ is considered. In addition, since notation with "^" symbol usually used in mathematics is not available in this specification, hereinafter, "'" symbol is substituted for "^".

In the case of a method of generating a basis transformation matrix using the method described in the first embodiment, firstly a modular polynomial $(x^{km+1}-1)/(x-1)$ is considered using a parameter k, next, $\gamma$ represented by the following expression is considered using $\omega$ which is a zero of the modular polynomial, and finally, a normal basis of the following expression is considered using the $\gamma$. Here, $\omega$ exists as an essential element in $F_{p^{km}}$.

$$\gamma = \sum_{i=0}^{k-1} \omega^{p^{im}} \quad [E20]$$

$$\{\gamma, \gamma^p, \gamma^{p^2}, \ldots, \gamma^{p^{m-1}}\} \quad [E21]$$

If an element $\gamma'$ corresponding to the $\gamma$ in the extension field $F'_{p^m}$ can be found, it is possible to determine a normal basis in the extension field $F'_{p^m}$ and determine a transformation matrix due to its correspondence relation between bases. Obtaining an inverse matrix of the transformation matrix enables to perform basis transformation.

Here, in order to obtain the element $\gamma'$, what is needed is only to determine $\omega'$ corresponding to $\omega$ in the extension field $F'_{p^{km}}$. In order to determine $\omega'$ in the extension field $F'_{p^{km}}$, k-degree successive extension of the extension field $F'_{p^m}$ is performed and an extension field $F'_{p^{km}}$ which isomorphic to $F_{p^{km}}$ is constructed.

Here, let k and m be relatively prime, if it is possible to find k' satisfying conditions that
 (1) K'k+1 is a prime number,
 (2) an order of p in $F_{k'k+1}$ is k'k (that is, p is a primitive element).

By performing k-degree successive extension of $F'_{p^m}$ using $(x^{k'k+1}-1)/(x-1)$ as a modular polynomial, $F'_{p^{km}}$ can be constructed. Here, "'" in k' is not a substitute for "^". Looking for an element B' that satisfies the following expression in the successive extension field $F'_{p^{km}}$, $\omega'$ is obtained.

$$B'^{(p^{km}-1)/(km+1)} \neq 1, \omega' = B'^{(p^{km}-1)/(km+1)} \quad [E22]$$

Here, since $\omega'$ is an element of order km+1, $\omega'$ corresponds to an element $\omega$ of order km+1 in $F_{p^{km}}$.

Therefore, considering the following set using an element $\gamma'$ given in the following expression, it is possible to correspond this set to a basis of $F_{p^m}$.

Using this, a transformation matrix and its inverse matrix can be obtained and it can be made possible to perform a basis transformation.

$$\gamma' = \sum_{i=0}^{k-1} \omega'^{p^{im}} \quad [E23]$$

$$\{\gamma', \gamma'^p, \gamma'^{p^2}, \ldots, \gamma'^{p^{m-1}}\} \quad [E24]$$

As described above, since the basis transformation is possible, it can be made possible to perform factorization of irreducible polynomials.

That is, firstly, considering an irreducible polynomial f(x) of degree m over $F_p$, and using a polynomial basis $\{1, \theta', \theta'^2, \ldots, \theta'^{m-1}\}$ with its zero $\theta'$, $F'_{p^m}$ can be constructed. Here, "'" is a substitute for notation "^"

And, carrying out mapping of an element $\theta'$ in $F'_{p^m}$ to a corresponding element $\theta$ in $F_{p^m}$ using a basis transformation matrix means that a solution of irreducible polynomial f(x) of degree m over $F_p$ is obtained over $F_{p^m}$.

Therefore, considering as far as conjugate elements, it is possible to factorize f(x) over $F_{p^m}$, hence, it is possible to factorize over an arbitrary extension field.

In devices which transmit and receive data to and from other devices such as personal computers, mobile phones, or credit cards with IC chip, by making key length arbitrarily changeable, it becomes possible to transmit and receive ciphertext data while adjusting a balance between required security and a processing load of encryption or decryption.

What is claimed is:

1. A non-transitory computer-readable recording medium recording a program for encryption/decryption with a Cyclic Vector Multiplication Algorithm which is configured, letting two elements $A=\{a_0, a_1, a_2, \ldots, a_{m-1}\}$ and $B=\{b_0, b_1, b_2, \ldots, b_{m-1}\}$ in an extension field $F_{p^m}$ of extension degree m with a prime number p as characteristic be plaintext data and an encryption key, or ciphertext data and a decryption key, to generate an element $C=\{c_0, c_1, c_2, \ldots, c_{m-1}\}$ of ciphertext data by multiplying the plaintext and the encryption key using an electronic computer, or to generate an element $C=\{c_0, c_1, c_2, \ldots, c_{m-1}\}$ of plaintext data by multiplying the ciphertext data and the decryption key, using an electronic computer, the program for encryption/decryption comprising:

a first step of determining a positive integer k satisfying conditions that km+1 is a prime number and p is a primitive element in a finite field $F_{km+1}$ with (km+1) elements;

a second step of multiplying said two elements A and B, regarding said two elements A and B as two elements in an extension field $F_{p^{km}}$ of extension degree km with a prime number p as characteristic using the positive integer k; and a third step of obtaining a result of multiplication in an element of the extension field $F_{p^m}$ of extension degree m which is a subfield of the extension field $F_{p^{km}}$, using the result of multiplication obtained in the second step, wherein letting i, j, and t be integers, $a_i$, $b_i$, and $c_i$ be coefficients of the elements A, B, and C respectively, M be a variable, K[t] be a t-th element of an array, q[<x>] be a <x>-th element of an array, <x> denoting x modulo (km+1), and ← be an assignment operator, the second step includes:

a step of obtaining respective $K[t]←<p^{mt}>$ for $0≦t≦k-1$;

a step of setting $q[<i>]←0$ respectively for $0≦i≦km$;

a step of obtaining $q[<p^i>]←a_i·b_i$ modulo p respectively for $0≦i≦m-1$; and a step of obtaining $M←(a_i-a_j)·(b_i-b_j)$ modulo p respectively for $0≦i<j≦m-1$ and adding M to $q[<p^i+(p^j·K[t])>]$ respectively for $0≦t≦k-1$.

2. The non-transitory computer-readable recording medium according to claim 1, wherein, the third step includes:

a step of adding $q[<(p^i·K[t])>]$ to $q[<p^i>]$ respectively for $0≦i≦m-1$, $1≦t≦k-1$; and a step of obtaining $c_i←k·q[<0>]-q[<p^i>]$ respectively for $0≦i≦m-1$.

3. The non-transitory computer-readable recording medium according to claim 1, wherein, in the case where k=2k', letting k' be a positive integer satisfying conditions that, in a finite field $F_{2k'm+1}$ with (2k'm+1) elements, p is a primitive element, or an order of p is k'm and k'm is an odd number, letting i, j, and t be integers, $a_i$, $b_i$, and $c_i$ be coefficients of the elements A, B, and C respectively, M be a variable, K[t] be a t-th element of an array, q[<x>] be a <x>-th element of an array, <x> denoting x modulo (2k'm+1), and ← be an assignment operator, the second step includes:

a step of obtaining respective $K[t]←<p^{mt}>$ for $0≦t≦k'-1$;

a step of setting $q[<i>]←0$ respectively for $0≦i≦2k'm$;

a step of obtaining $q[<p^i>]←a_i·b_i$ modulo p respectively for $0≦i≦m-1$; and a step of obtaining $M←(a_i-a_j)·(b_i-b_j)$ modulo p respectively for $0≦i<j≦m-1$, adding M to $q[<p^i+(p^j·K[t])>]$ and also adding M to $q[<p^i-(p^j·K[t])>]$ respectively for $0≦t≦k'-1$.

4. The non-transitory computer-readable recording medium according to claim 3, wherein, the third step includes:

a step of adding $q[<p^i·K[t]>]$ to $q[<p^i>]$ and also adding $q[<-(p^i·K[t])>]$ to $q[<p^i>]$ respectively for $0≦i≦m-1$, $1≦t≦k'-1$; and a step of obtaining $c_i←-q[<p^i>]$ respectively for $0≦i≦m-1$.

5. An apparatus for encryption/decryption having an arithmetic unit configured with a Cyclic Vector Multiplication Algorithm which is configured, letting two elements $A=\{a_0, a_1, a_2, \ldots, a_{m-1}\}$ and $B=\{b_0, b_1, b_2, \ldots b_{m-1}\}$ in an extension field $F_{p^m}$ of extension degree m with a prime number p as characteristic be plaintext data and an encryption key, or ciphertext data and a decryption key, to encrypt by means of generating an element $C=\{c_0, c_1, c_2, \ldots, c_{m-1}\}$ by multiplying the plaintext and the encryption key, or to decrypt by means of generating an element $C=\{c_0, c_1, c_2, \ldots, c_{m-1}\}$ by multiplying the ciphertext data and the decryption key, the apparatus for encryption/decryption comprising:

a first memory unit which is configured to store the elements respectively;

a second memory unit which is configured to store the extension degree m;

a third memory unit which is configured to store a positive integer k determined such that km+1 is a prime number and p is a primitive element in a finite field $F_{km+1}$ with (km+1) elements based on arithmetic operations performed by the arithmetic unit;

a fourth memory unit which is configured to store a result of multiplication processing performed by the arithmetic unit, regarding the two elements A and B as two elements in an extension field Fpkm of extension degree km with the prime number p as characteristic using the positive integer k; and a fifth memory unit which is configured to store a result of multiplication in an element in the extension field $F_{p^m}$ of extension degree m which is a subfield of $F_{p^{km}}$, the result being obtained by means of predetermined arithmetic operations performed by the arithmetic unit using the result of multiplication in an element in the extension field $F_{p^{km}}$ of extension degree km, wherein letting i, j, and t be integers, $a_i$, $b_i$, and $c_i$ be coefficients of the elements A, B, and C respectively, M be a variable, K[t] be a t-th element of an array, q[<x>] be a <x>-th element of an array, <x> denoting x modulo (km+1), and ← be an assignment operator, the fourth memory unit includes:

a memory for storing respective K[t] where K[t]←<$p^{mt}$> for $0 \leq t \leq k-1$;

a memory for storing q[<i>] set by q[<i>]←0 respectively for $0 \leq i \leq km$;

a memory for storing q[<$p^i$>] obtained by q[<$p^i$>]←$a_i \cdot b_i$ modulo p respectively for $0 \leq i \leq m-1$;

a memory for storing M obtained by M←$(a_i \cdot a_j) \cdot (b_i - b_j)$ modulo p respectively for $0 \leq i < j \leq m-1$; and a memory for storing q[<$p^i + (p^j \cdot K[t])$>] added by M respectively for $0 \leq t \leq -1$.

6. The apparatus for encryption/decryption according to claim 5, wherein, the fifth memory unit includes:

a memory for storing q[<$p^i$>] added by q[<($p^i \cdot K[t]$)>] respectively for $0 \leq i \leq m-1$; $1 \leq t \leq k-1$; and a memory for storing $c_i$ obtained by $c_i \leftarrow k \cdot [<0>] - q[<p^i>]$ respectively for $0 \leq i \leq m-1$.

7. The apparatus for encryption/decryption according to claim 5, wherein, in the case where k=2k', the apparatus for encryption/decryption includes a memory unit which, letting a positive integer k' be such that in a finite field $F_2k'm+1$ with (2k'm+1) elements, p is a primitive element or an order of p is k'm and k'm is an odd number, stores the positive integer k', letting i, j, and t be integers, $a_i$, $b_i$, and $c_i$ be coefficients of the elements A, B, and C respectively, M be a variable, K[t] be a t-th element of an array, q[<x>] be a <x>-th element of an array, <x> denoting x modulo (2k'm+1), and ← be an assignment operator, the fourth memory unit includes:

a memory for storing respective K[t] where K[t]←−<$p^{mt}$> for $0 \leq t \leq k'-1$;

a memory for storing q[<i>] set by q[<i>]←0 respectively for $0 \leq i \leq 2k'm$;

a memory for storing q[<$p^i$>] obtained by q[<$p^i$>]←$a_i \cdot b_i$ modulo p respectively for $0 \leq i \leq m-1$;

a memory for storing M obtained by M←$(a_i - a_j) \cdot (b_i - b_j)$ modulo p respectively for $0 \leq i < j \leq m-1$; and a memory for storing q[<$p^i + (p^j \cdot K[t])$>] added by M, and also storing q [<$p^i - (p^i \cdot K[t])$>] added by M respectively for $0 \leq t \leq k'-1$.

8. The apparatus for encryption/decryption according to claim 7, wherein, the fifth memory unit includes:

a memory for storing q[<$p^i$>] added by q[<($p^i \cdot K[t]$)>], and also storing q[<$p^i$>] added by q[<$-(p^i \cdot K[t])$>] respectively for $0 \leq i \leq m-1$, $1 \leq t \leq k'-1$; and a memory for storing $c_i$ obtained by $c_i \leftarrow -q[<p^i>]$ respectively for $0 \leq i \leq m-1$.

9. An apparatus for multiplication in an extension field having an arithmetic unit in a Cyclic Vector Multiplication Algorithm which is configured to generate an element C={$c_0$, $c_1$, $c_2$, . . . , $c_{m-1}$} by multiplying two elements A={$a_0$, $a_1$, $a_2$, . . . , $a_{m-1}$} and B={$b_0$, $b_1$, $b_2$, . . . , $b_{m-1}$} in an extension field $F_{p^m}$ of extension degree m with a prime number p as characteristic, the apparatus for multiplication in an extension field comprising:

a first memory unit which is configured to store the elements respectively;

a second memory unit which is configured to store the extension degree m;

a third memory unit which is configured to store a positive integer k determined such that km+1 is a prime number and p is a primitive element in a finite field $F_{km+1}$ with (km+1) elements, based on arithmetic operations performed by the arithmetic unit;

a fourth memory unit which is configured to store a result of multiplication processing performed by the arithmetic unit, regarding the two elements A and B as two elements in an extension field $F_{p^{km}}$ of extension degree km with the prime number p as characteristic using the positive integer k; and a fifth memory unit which is configured to store a result of multiplication in an element in the extension field $F_{p^m}$ of extension degree m which is a subfield of $F_{p^{km}}$, the result of multiplication being obtained by means of predetermined arithmetic operations performed by the arithmetic unit using the result of multiplication in an element in the extension field $F_{p^{km}}$ of extension degree km.

* * * * *